United States Patent
Takeda et al.

(10) Patent No.: US 11,323,997 B2
(45) Date of Patent: May 3, 2022

(54) USER TERMINAL AND RADIO BASE STATION

(71) Applicant: NTT DOCOMO, INC., Tokyo (JP)

(72) Inventors: Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/054,379

(22) PCT Filed: May 11, 2018

(86) PCT No.: PCT/JP2018/018432
§ 371 (c)(1),
(2) Date: Nov. 10, 2020

(87) PCT Pub. No.: WO2019/215932
PCT Pub. Date: Nov. 14, 2019

(65) Prior Publication Data
US 2021/0227514 A1    Jul. 22, 2021

(51) Int. Cl.
*H04W 72/04* (2009.01)
*H04L 1/00* (2006.01)

(52) U.S. Cl.
CPC ......... *H04W 72/042* (2013.01); *H04L 1/0038* (2013.01)

(58) Field of Classification Search
CPC ............................ H04W 72/042; H04L 1/0038
See application file for complete search history.

(56) References Cited

U.S. PATENT DOCUMENTS

2019/0306700 A1* 10/2019 Lin .................. H04W 24/08

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010 (149 pages).
3GPP TSG RAN WG1 Meeting #91; R1-1719387 "Coreset configuration and search space design" Huawei, HiSilicon; Reno, USA; Nov. 27-Dec. 1, 2017 (14 pages).
International Search Report issued in International Application No. PCT/JP2018/018432, dated Jul. 31, 2018 (3 pages).
Written Opinion issued in International Application No. PCT/JP2018/018432; dated Jul. 31, 2018 (3 pages).

(Continued)

*Primary Examiner* — Ronald B Abelson
(74) *Attorney, Agent, or Firm* — Osha Bergman Watanabe & Burton LLP

(57) ABSTRACT

A user terminal includes a receiving section that performs monitoring of downlink control channel candidates in at least one of a plurality of cells having a plurality of numerologies, a transmitting section that transmits a parameter indicating a capability for the monitoring, and a control section that determines at least one number of a first maximum number of blind decodings of the downlink control channel candidates within a unit of time and a second maximum number of channel estimation control channel elements within the unit of time for each of the plurality of numerologies based on the parameter to control the monitoring, based on the number.

8 Claims, 8 Drawing Sheets

| MAXIMUM NUMBER OF PDCCH BLIND DECODINGS PER SLOT | SUBCARRIER SPACING | | | |
|---|---|---|---|---|
| | 15kHz | 30kHz | 60kHz | 120kHz |
| CASE 1-1 | 44 | 36 | 22 | 20 |
| CASE 1-2 | 44 | | | — |
| CASE 2 | 44 | 36 | 22 | 20 |

(56) References Cited

OTHER PUBLICATIONS

3GPP TSG RAN WG1 Meeting #92; R1-1801531 "Remaining details on PDCCH search space" vivo; Athens, Greece Feb. 26-Mar. 2, 2018 (6 pages).
3GPP TSG RAN WG1 Meeting #92bis; R1-1804798 "Remaining issues on control resource set and search space" Qualcomm Incorporated; Sanya, China; Apr. 16-20, 2018 (14 pages).
Extended European Search Report issued in European Application No. 18918401.3, dated Nov. 18, 2021 (9 pages).

* cited by examiner

FIG. 1A

| MAXIMUM NUMBER OF PDCCH BLIND DECODINGS PER SLOT | SUBCARRIER SPACING | | | |
|---|---|---|---|---|
| | 15kHz | 30kHz | 60kHz | 120kHz |
| CASE 1-1 | 44 | 36 | 22 | 20 |
| CASE 1-2 | 44 | | | - |
| CASE 2 | 44 | 36 | 22 | 20 |

FIG. 1B

| MAXIMUM NUMBER OF CHANNEL ESTIMATION CCES PER SLOT | SUBCARRIER SPACING | | | |
|---|---|---|---|---|
| | 15kHz | 30kHz | 60kHz | 120kHz |
| CASE 1-1 | 56 | 56 | 48 | 32 |
| CASE 1-2 | 56 | | | - |
| CASE 2 | 56 | 56 | 48 | 32 |

USER TERMINAL AND RADIO BASE STATION

TECHNICAL FIELD

The present invention relates to a user terminal and a radio base station in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency and so on (see Non-Patent Literature 1). Moreover, aiming at further wider bandwidth and higher speed than LTE (also referred to as LTE Rel. 8 or Rel. 9), the specifications of LTE-A (LTE-Advanced, also referred to as LTE Rel. 10, Rel. 11, or Rel. 12) were drafted, and successor systems of LTE (also referred to as, for example, FRA (Future Radio Access), 5G (5th generation mobile communication system), 5G+ (plus), NR (New Radio), NX (New radio access), FX (Future generation radio access), LTE Rel. 13, Rel. 14, Rel. 15 or later versions, and so on) are also under study.

In existing LTE systems (for example, LTE Rel. 8 to Rel. 13), downlink (DL) and/or uplink (UL) communications are carried out using 1 ms subframes (also referred to as "transmission time intervals (TTIs)" and so on). The subframe is a transmission time unit of one data packet coded by channel coding, and is a processing unit of scheduling, link adaptation, retransmission control (HARQ (Hybrid Automatic Repeat reQuest)), and so on.

A radio base station controls allocation (scheduling) of data for a user terminal, and notifies the user terminal of a scheduling of data by using downlink control information (DCI). The user terminal monitors a downlink control channel (PDCCH) on which downlink control information is transmitted to perform a receiving process (demodulation or decoding process, and the like), and controls DL data reception and/or uplink data transmission, based on the received downlink control information.

The transmission on the downlink control channel (PDCCH/EPDCCH) is controlled by use of one or aggregation of a plurality of control channel elements (CCE/ECCE (Enhanced Control Channel Element)). Each control channel element includes a plurality of resource element groups (REGs/EREGs (Enhanced Resource Element Groups)). The resource element group is also used in a case that control channel mapping to the resource element (RE) is performed.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (hereinafter, also referred to as NR), a plurality of numerologies are required to be supported, and it is necessary to use a structure different from the existing LTE systems (for example, LTE Rel. 13 or previous versions). The numerology refers to, for example, communication parameters applied to transmit and receive a signal (for example, subcarrier spacing, bandwidth, and the like).

Thus, in NR, although it is necessary to control transmission and reception of signals/channels different from the existing LTE systems (for example, downlink control channel and the like), how to control the transmission and reception of the downlink control channel and the like is not still sufficiently studied. If a UE cannot appropriately receive the downlink control channel and the like, communication throughput is likely to decrease to deteriorate a communication quality.

An object of the present disclosure is to provide a user terminal and a radio base station capable of suppressing communication quality deterioration even in a case that a control channel and the like are transmitted and received in a structure different from the existing LTE systems.

Solution to Problem

An aspect of a user terminal according the present disclosure includes a receiving section that performs monitoring of downlink control channel candidates in at least one of a plurality of cells having a plurality of numerologies, a transmitting section that transmits a parameter indicating a capability for the monitoring, and a control section that determines at least one number of a first maximum number of blind decodings of the downlink control channel candidates within a unit of time and a second maximum number of channel estimation control channel elements within the unit of time for each of the plurality of numerologies based on the parameter to control the monitoring, based on the number.

Advantageous Effects of Invention

According to the present invention, communication quality deterioration can be suppressed even in a case that a control channel and the like are transmitted and received in a structure different from the existing LTE systems.

BRIEF DESCRIPTION OF DRAWINGS

FIG. 1A is a diagram to show an example of a maximum number of blind decodings, and FIG. 1B is a diagram to show an example of a maximum number of channel estimation control channel elements;

DESCRIPTION OF EMBODIMENTS

Figure 2:
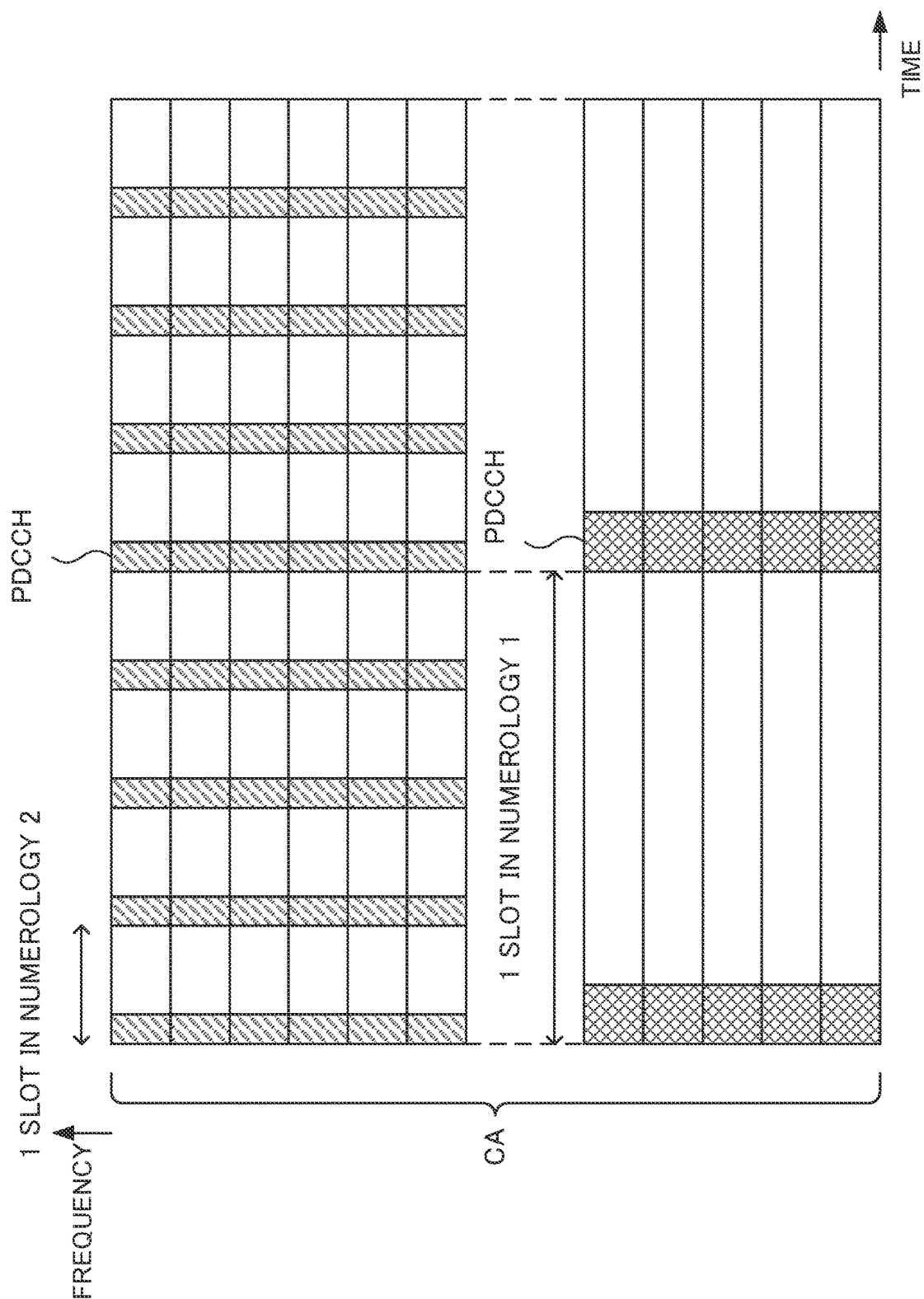
FIG. 2 is a diagram to show an example of CA by using a plurality of CCs having different numerologies.

In the existing LTE systems, a radio base station transmits downlink control information (DCI) by use of a downlink control channel (for example, PDCCH (Physical Downlink Control Channel) or an enhanced PDCCH (EPDCCH), or the like) to a UE. Transmitting the downlink control information may be interpreted as transmitting the downlink control channel.

The DCI may be, for example, scheduling information including at least one of information indicating a time for scheduling data and a frequency resource, information indicating a transport block size, information indicating a data modulation scheme, information indicating a HARQ process identifier, information on a demodulation RS, and the like. The DCI scheduling DL data reception and/or DL reference signal measurement may be referred to as "DL assignment" or "DL grant," and the DCI scheduling UL data transmission and/or UL sounding (for measurement) signal transmission may be referred to as "UL grant."

The DL assignment and/or the UL grant may include information on a resource, sequence, and transmission format of a channel used to transmit a UL control signal (UCI (Uplink Control Information)) such as a HARQ-ACK feedback for the DL data and channel measurement information (CSI (Channel State Information). The DCI for scheduling the UL control signal (UCI (Uplink Control Information)) may be defined separately from the DL assignment and the UL grant.

The UE is configured to monitor the certain number of sets of downlink control channel candidates in a certain time unit (for example, subframe). Here, the term "monitor" refers to, for example, attempting to decode each downlink control channel for a targeted DCI format in the relevant set. Such a decoding is also referred to as blind decoding (BD) or blind detection. The downlink control channel candidate is also referred to as a BD candidate, a (E)PDCCH candidate, or the like.

A search area and search method for the downlink control channel candidate are defined as a search space (SS). The search space may be configured to include a plurality of search space sets (SS sets). In this case, one or a plurality of downlink control channel candidates are mapped to any search space set.

In NR, a study is underway to use a control resource set (CORESET) in order to transmit a physical layer control signal (for example, downlink control information (DCI)) from the base station to the UE.

The CORESET is a parameter set required for control channel (for example, PDCCH (Physical Downlink Control Channel)) resource allocation. The UE may receive configuration information of the CORESET (which may be referred to as "CORESET configuration") from the base station. The UE monitors a PDCCH based on at least the configuration information of the CORESET to detect a physical layer control signal.

The CORESET configuration may be reported by higher layer signaling, for example. Here, for example, the higher layer signaling may be any one or combinations of RRC (Radio Resource Control) signaling, MAC (Medium Access Control) signaling, broadcast information, and the like.

The UE may receive configuration information on a search space for PDCCH monitoring (which may be referred to as a search space configuration) from the base station. The search space configuration information may include information on a search space set configured for the UE. The search space configuration information may be reported to the UE through, for example, higher layer signaling (RRC signaling or the like). The search space set configured according to the search space configuration information may be configured to be associated with the CORESET. Specifically, the UE can monitor the PDCCH based on at least two of the CORESET configuration information and the search space configuration information.

The search space configuration information includes mainly information on the PDCCH monitoring related configuration and decoding related configuration, and may include information on, for example, at least one of the following items.

Identifier of a search space set (search space set ID)

CORESET ID associated with the relevant search space set

Flag indicating whether the relevant search space set is a common search space (CSS, C-SS (Common SS)) that is configured common to the UE, or a UE-specific search space (USS, UE-SS (UE-specific SS)) that is configured for each UE.

The number of PDCCH candidates for each aggregation level

Monitoring periodicity

Monitoring offset

Monitoring pattern in a slot (for example, 14-bit bitmap)

The UE monitors the CORESET, based on the search space configuration information. The phrase "monitor of a CORESET" may be interpreted as "monitor of a search space (PDCCH candidate) associated with a CORESET," "monitor of a downlink control channel (for example, PDCCH)," and the like.

The UE may determine a correspondence relationship between the search space set and the CORESET based on the search space set ID included in the search space configuration information and the CORESET ID described above. One CORESET may be associated with one or a plurality of search space sets. A case that one CORESET is associated with a plurality of search space configurations may be a case, for example, that both the CSS and the USS are configured in the CORESET. Note that one search space configuration may be associated with a plurality of CORESETs.

The search space where the UE monitors the PDCCH candidates may include search spaces as described below. Specifically, search space types may be classified into the CSS and the USS and further, a plurality of types may be configured in the CSS, or the following all types of CSSs may not be classified to be comprehensively handled as the CSS.

Type 0-PDCCH CSS

Type 0A-PDCCH CSS

Type 1-PDCCH CSS

Type 2-PDCCH CSS

Type 3-PDCCH CSS

USS

Type 0-PDCCH CSS may be referred to as a SS for a DCI format which is cyclic redundancy check (CRC)-masked (scrambled) with a system information radio network temporary identifier (SI-RNTI).

Type 0A-PDCCH CSS may be referred to as a SS for a DCI format which is CRC-scrambled with a SI-RNTI. Note that Type 0-PDCCH may be used to report RMSI, for example, and Type 0A-PDCCH may be used to report other SI (OSI (Other System Information)), for example.

Type 1-PDCCH CSS may be referred to as a SS for a DCI format which is CRC-scrambled with a random access RNTI (RA-RNTI), temporary cell RNTI (TC-RNTI), or cell RNTI (C-RNTI).

Type 2-PDCCH CSS may be referred to as a SS for a DCI format which is CRC-scrambled with a paging RNTI (P-RNTI).

Type 3-PDCCH CSS may be referred to as a SS for a DCI format which is CRC-scrambled with an INT-RNTI (INTerruption RNTI) for DL preemption indication, an SFI-RNTI (Slot Format Indicator RNTI) for slot format indication, a TPC-PUSCH-RNTI for transmit power control (TPC) of the PUSCH (Physical Uplink Shared Channel), a TPC-PUCCH-RNTI for TPC of the PUCCH (Physical Uplink Control Channel), a TPC-SRS-RNTI for TPC of the SRS (Sounding Reference Signal), a C-RNTI, or a CS-RNTI (Configured Scheduling RNTI).

USS: this may be referred to as a SS for a DCI format which is CRC-scrambled with a C-RNTI or a CS-RNTI. In the USS, monitoring of at least one or a plurality of DCI formats 0_0, 0_1, 1_0, and 1_1 can be configured.

The type of the search space can be said to be information that associates characteristics of the DCI transmitted on the monitored PDCCH candidates (format, RNTI, and the like) with the search space.

Here, the future radio communication systems (NR) is required to employ a plurality of numerologies to control the communication. For example, it is assumed that, in NR, a plurality of subcarrier spacings (SCS) are employed based on the frequency band and the like to perform transmission and reception. The subcarrier spacing to be employed may be 15 kHz, 30 kHz, 60 kHz, 120 kHz, 240 kHz, or the like. Of course, applicable subcarrier spacing is not limited to those.

In order to suppress increasing in a UE processing load or the like, the maximum number of times of decoding (for example, blind decoding) by the UE may be configured in advance. For example, as shown in FIG. 1A, the maximum number of times of blind decoding (BD) (BD maximum number, PDCCH BD maximum number) may be configured for each subcarrier spacing applied to the PDCCH transmission (BD maximum number in a non-CA case). Note that the maximum number of times of the BD shown in FIG. 1A is an example, without limitation. The number of times of BD (the number of BDs, the number of PDCCH BDs) may be interpreted as the number of PDCCH candidates monitored by the UE.

Cases 1-1 and 1-2 shown in FIG. 1A correspond to a case that a monitoring periodicity for the PDCCH CRC-scrambled with the C-RNTI or the CS-RNTI is equal to or more than 14 symbols, and a case 2 corresponds to a case that the monitoring periodicity for the PDCCH CRC-scrambled with the C-RNTI or the CS-RNTI is less than 14 symbols. Specifically, the cases 1-1 and 1-2 correspond to a case of the monitoring periodicity of one time or less per slot for the PDCCH CRC-scrambled with the C-RNTI or the CS-RNTI, and the case 2 correspond to a case of the monitoring periodicity of two times or more per slot for the PDCCH CRC-scrambled with the C-RNTI or the CS-RNTI.

The case 1-1 may be employed in a case that the PDCCH is monitored for the first to a certain symbol (for example, up to the third symbol) of the slot. The case 1-2 may be employed in a case that the PDCCH is monitored for any interval in certain symbols (for example, three symbols) continuous in the slot. Note that in the cases 1-1 and 1-2, a case is permitted that a plurality of monitorings are configured in the certain symbol interval. In other words, the PDCCH monitorings in the certain symbol interval can be collectively counted as one time.

The case 1-1 shown in FIG. 1A shows a case that when the subcarrier spacing (SCS) is 15 kHz, the maximum number of times of the BD for the PDCCH per slot is 44. Further, a case is shown that the maximum number of times of the BD when the SCS is 30 kHz is 36, a case is shown that the maximum number of times of the BD when the SCS is 60 kHz is 22, and a case is shown that the maximum number of times of the BD when the SCS is 120 kHz is 20.

In general, since a slot length decreases as the SCS increases, if the same number of times of the BD per slot is performed for different SCSs, the UE is required to perform BD processing for a short time in a case that the SCS is large, and the processing load is increased. For this reason, by decreasing the maximum number of times of the BD as the subcarrier spacing increases, increase in the load on the receiving process by the UE (for example, the blind decoding or the like) can be suppressed.

A study is also underway to configure the maximum number of the number of candidates for each aggregation level (AL) of the CCE. For AL=4, 8, and 16, 4, 2, and 1 may be defined, respectively. Note that a relationship between the AL and the maximum number of candidates used for the CSS for the downlink control channel of a certain type (for example, at least one of Type 0, Type 0A, and Type 2) may be defined.

As for at least the case 1-1 and the case 1-2 in FIG. 1A, a study is underway to support, by the UE, channel estimation capability with respect the certain number of CCEs in certain slots for each scheduled cell. In this case, the UE has a capability of performing channel estimation (for example, demodulation processing) in the certain slots (for example, one slot) by use of at least the certain number of CCEs.

For example, in a case 1-1 in FIG. 1B, for SCS=15 kHz and 30 kHz, the UE supports the channel estimation by use of a first number of CCEs (for example, the number of CCEs is 56). Specifically, the UE can demodulate at least the first number of CCEs per certain slots (for example, one slot). For SCS=60 kHz, the UE supports the channel estimation by use of a second number of CCEs (for example, the number of CCEs is 48). For SCS=120 kHz, the UE supports the channel estimation by use of a third number of CCEs (for example, the number of CCEs is 32)(CCE maximum number in the non-CA case).

In this manner, in a case that the number of channel estimation CCEs that can be supported by the UE is configured, mapping of the number of downlink control channel candidates (or monitoring of the search space) may be controlled in consideration of at least one of the number of blind decodings and the number of channel estimation CCEs.

For example, the control may be made such that one or both of a first condition and a second condition are satisfied, the first condition being that the number of times of mapping of the downlink control channel candidates to the search space set is equal to or less than the certain number of blind decodings (for example, the maximum number of times of the BD), the second condition being that the relevant number of times of mapping is equal to or less than the certain number of channel estimation CCEs. For example, the UE may not perform the blind decoding of a certain downlink control channel candidate in a case that any of the first or second condition is not satisfied in a certain slot or a certain PDCCH monitoring time.

A study is underway, as a rule for the mapping of the downlink control channel candidates to the search space set (PDCCH mapping rule, mapping order) regarding the all downlink control channel candidates in the USS set in the cases 1-1 and case 1-2, to map the downlink control channel candidate having a lower search space set index (SS set ID) before a high search space set index. A study is underway to drop (not to be mapped) a search space set and a subsequent search space set in a case that all candidates in the search space set cannot be mapped. A study is underway to apply the PDCCH mapping rule to the case 2.

A bitmap (for example, 14 bits) may be used to configure a PDCCH monitoring occasion in one slot to each search space set.

A study is underway to configure a search space set for each cell in the CA using a plurality of cells (or component carrier (CC)). A study is underway to assign the search space set index for each CC.

A case is assumed that the CA uses a plurality of CC in which a plurality of CCs have different numerologies. For example, a study is underway to support up to two numerologies per PUCCH group and up to two PUCCH groups having a numerology corresponding to each PUCCH group. Accordingly, although a case is considered that up to four numerologies are required to be supported for the PUCCH monitoring across a plurality of CCs, a PDCCH mapping rule capable of dealing with this case is not decided.

Then, how to limit at least one of the number of BDs and the number of CCEs is an issue for the CA by use of a plurality of numerologies. Unless at least one of the number of BDs and the number of CCEs is appropriately configured, the UE is likely to monitor an unnecessary search space set. In this case, a communication throughput is likely to decrease to deteriorate a communication quality.

Then, the inventors of the present invention came up with the idea of determining a limitation on at least one of the BD and the CCE within a unit of time for each of a plurality of numerologies base on parameters indicating the UE capability.

Embodiments according to the present invention will be described in detail with reference to the drawings as follows. Aspects described below may be employed independently or in combination.

Embodiment

A description is given of limitation on at least one of the number of BDs and the number of CCEs in the CA by use of of a plurality of CCs having different numerologies.
(Limitation in One Scheduled CC)

The limitation on at least one of the number of BDs and the number of CCEs per scheduled CC per slot (in one scheduled CC in one slot) may be the same as that of the non-CA case describe above.
(Limitation Across a Plurality of Scheduled CCs)

In a case that a plurality of CCs (cells) have different numerologies, a length of one slot, a time resource for the PDCCH, and the like are different, and thus, the limitation on at least one of the number of BDs and the number of CCEs is preferably determined for the numerology.

The limitation on at least one of the number of BDs and the number of CCEs may be differentiated depending on up to how many CCs having one numerology the UE supports in the CA.
<<The Number of BDs>>

For a UE supporting the CA by use of up to X DL-CCs having one given numerology, the PDCCH BD maximum number (BD maximum number) per slot to be supported by the UE may be X×M. X is equal to or less than the certain number of CCs (X the certain number of CCs).

For a UE supporting the CA by use of up to Y DL-CCs having one given numerology, the BD maximum number per slot to be supported by the UE may be y×M. Y is larger than the certain number of CCs (Y>the certain number of CCs).

The certain number of CCs is 4, for example.

A parameter indicating up to how many DL-CCs having one numerology the UE supports in the CA (CC maximum number, X or Y) may be reported from the UE to the radio base station (network, gNB, eNB). The CC maximum number may be reported as the UE capability. Here, the CC maximum number for each of a plurality of numerologies may be reported. The CC maximum number for a specific numerology (for example, numerology supported by the UE) may be reported. The CC maximum number per numerology may be reported.

M may be determined based on the numerology configured for the DL-CC (for example, SCS). For example, M is {44, 36, 22, 20} for the SCS of {15 kHz, 30 kHz, 60 kHz, 120 kHz}, respectively.

y may be one of integers from 4 to 16. y may be reported as the UE capability from the UE to the radio base station. The UE may determine y in consideration of the BD maximum number across a plurality of DL-CCs per numerology.

For example, as shown in FIG. 2, a specific example is described in which the UE supports the CA by use of up to five CCs having a numerology 1 (for example, SCS is 15 kHz) and up to six CCs having a numerology 2 (for example, SCS is 60 kHz). In a case that the UE reports that y is 4, the BD maximum number per slot for each of the numerologies 1 and 2 is y×M=4×M.

y is common to the numerologies 1 and 2. On the other hand, M is determined based on each numerology, and thus, may be different depending on the numerology. Accordingly, the BD maximum number per slot (X×M, Y×M) may be different depending on the numerology.

Since one y may be reported without depending on the numerology, overhead of reporting can be suppressed. The same process is performed regardless of whether or not the CA uses a plurality of numerologies, and thus, complexity of the processing by the UE can be suppressed.
<<The Number of CCEs>>

For a UE supporting the CA by use of up to X DL-CCs having one given numerology, the maximum number of CCEs (CCE maximum number) used for the channel estimation per slot to be supported by the UE may be X×N. X is equal to or less than the certain number of CCs (X 5 the certain number of CCs).

For a UE supporting the CA by use of up to Y DL-CCs having one given numerology, the CCE maximum number per slot to be supported by the UE may be y×N. Y is larger than the certain number of CCs (Y>the certain number of CCs).

The certain number of CCs is 4, for example.

N may be determined based on the numerology configured for the DL-CC (for example, SCS). For example, M is {56, 56, 48, 32} for the SCS of {15 kHz, 30 kHz, 60 kHz, 120 kHz}, respectively.

y may be one of integers from 4 to 16. y may be reported as the UE capability from the UE to the radio base station. The UE may determine y in consideration of the CCE maximum number across a plurality of DL-CCs per numerology.

For example, as shown in FIG. 2, a specific example is described in which the UE supports the CA by use of up to five CCs having a numerology 1 and up to six CCs having a numerology 2. In a case that the UE reports that y is 4, the CCE maximum number per slot for each of the numerologies 1 and 2 is y×N=4×N. N is determined based on each of the numerologies 1 and 2.

y is common to the numerologies 1 and 2. On the other hand, N is determined based on each numerology, and thus, may be different depending on the numerology. Accordingly, the CCE maximum number per slot (X×N, Y×N) may be different depending on the numerology.

Since one y may be reported without depending on the numerology, overhead of reporting can be suppressed. The same process is performed regardless of whether or not the CA uses a plurality of numerologies, and thus, complexity of the processing by the UE can be suppressed.

At least one search space set (for example, USS set) may be configured for at least one CC having each numerology, and the downlink control channel candidates may be mapped to the search space set under the limitation on at least one of the BD maximum number and the CCE maximum number. According to this limitation, as for at least one of the number of BDs and the number of CCEs, appropriate mapping depending on the UE capability can be made for each numerology. In a case that two or more cells have one numerology, at least one of the BD maximum number and the CCE maximum number can be limited across two or more cells depending on the UE capability.

y for determining the BD maximum number and y for determining the CCE may be common. In this case, the UE may determine y in consideration of the BD maximum number across a plurality of DL-CCs per numerology and the CCE maximum number across a plurality of DL-CCs per numerology. Since y is common, overhead of reporting can be suppressed.

y for determining the BD maximum number and y for determining the CCE maximum number may be reported as different parameters. By report y independently with respect to the BD and the CCE, the BD maximum number and the CCE maximum number can be flexibly configured.

(CC Index)

In the PDCCH mapping rule, a CC index of the scheduled CC may be further taken into consideration.

A lower scheduled CC index may be prioritized for one given search space set index.

A lower search space set index may be prioritized for one given scheduled CC index.

The PDCCH can be appropriately mapped by use of such CC index and search space index.

Since X, Y, and the CC index described above are related to the scheduled CC, the present embodiment can be employed regardless of whether or not cross carrier scheduling is performed.

(Radio Communication System)

Hereinafter, a structure of a radio communication system according to one embodiment of the present invention will be described. In this radio communication system, the radio communication method according to each embodiment of the present invention described above may be used alone or may be used in combination for communication.

Figure 3:
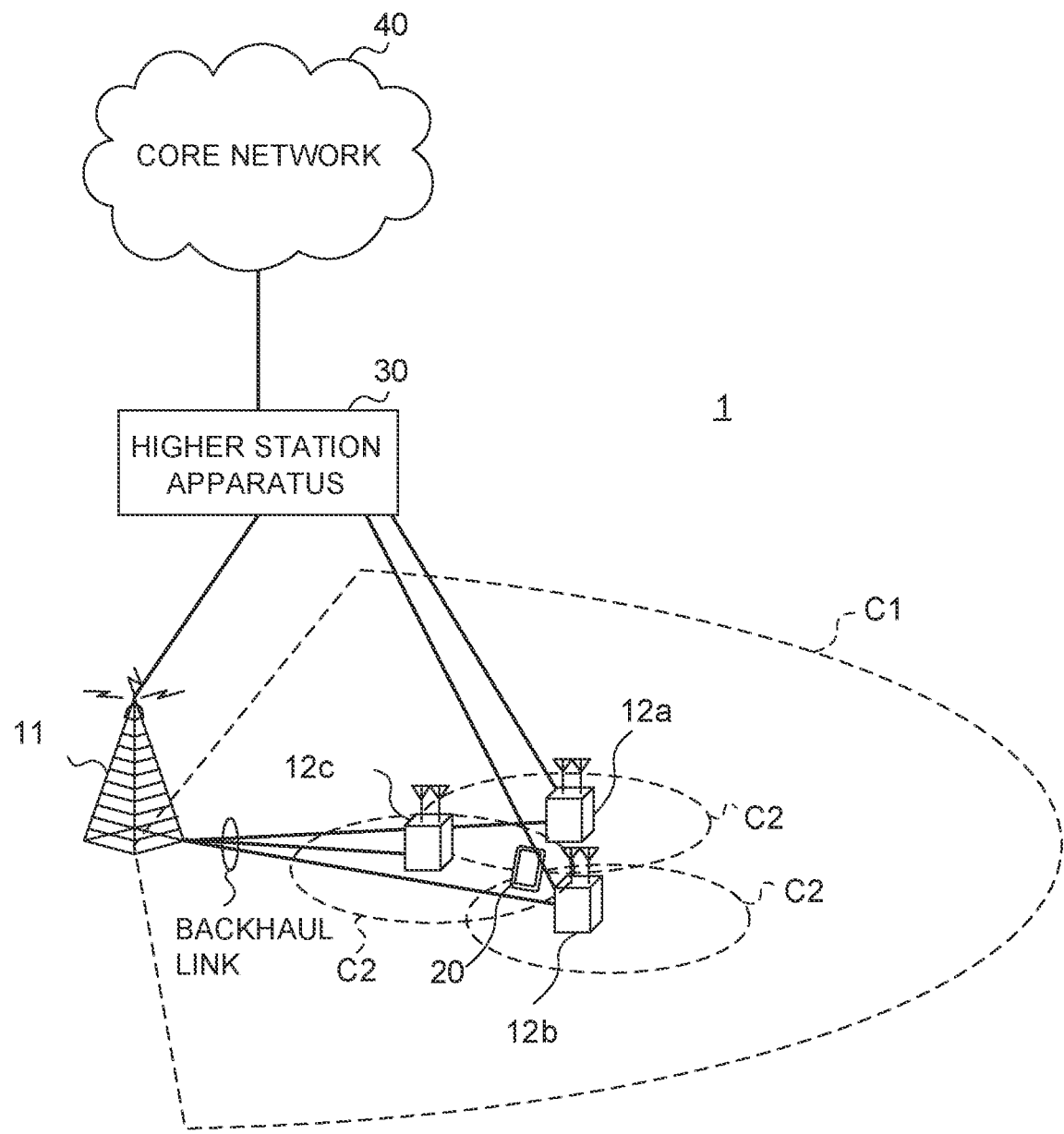
FIG. 3 is a diagram to show an example of a schematic structure of a radio communication system according to one embodiment of the present invention.

FIG. 3 is a diagram to show an example of a schematic structure of the radio communication system according to one embodiment of the present invention. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12*a* to 12*c*) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. The user terminals 20 may adopt CA or DC by using a plurality of cells (CCs) (for example, five or less CCs, or six or more CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

The user terminals 20 can perform communication by using time division duplex (TDD) and/or frequency division duplex (FDD) in each cell. Furthermore, in each cell (carrier), a single numerology may be employed, or a plurality of different numerologies may be employed.

A wired connection (for example, means in compliance with the CPRI (Common Public Radio Interface) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (ME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks) are communicated on the PBCH.

The downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on. Downlink control information (DCI), including PDSCH and/or PUSCH scheduling information, and so on are communicated on the PDCCH.

Note that the scheduling information may be reported by the DCI. For example, the DCI scheduling DL data reception may be referred to as "DL assignment," and the DCI scheduling UL data transmission may be referred to as "UL grant."

The number of OFDM symbols to use for the PDCCH is communicated on the PCFICH. Transmission confirmation information (for example, also referred to as "retransmission control information," "HARQ-ACK," "ACK/NACK," and so on) of HARQ (Hybrid Automatic Repeat reQuest) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio quality information (CQI (Channel Quality Indicator)) of the downlink, transmission confirmation information, scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

(Radio Base Station)

Figure 4:
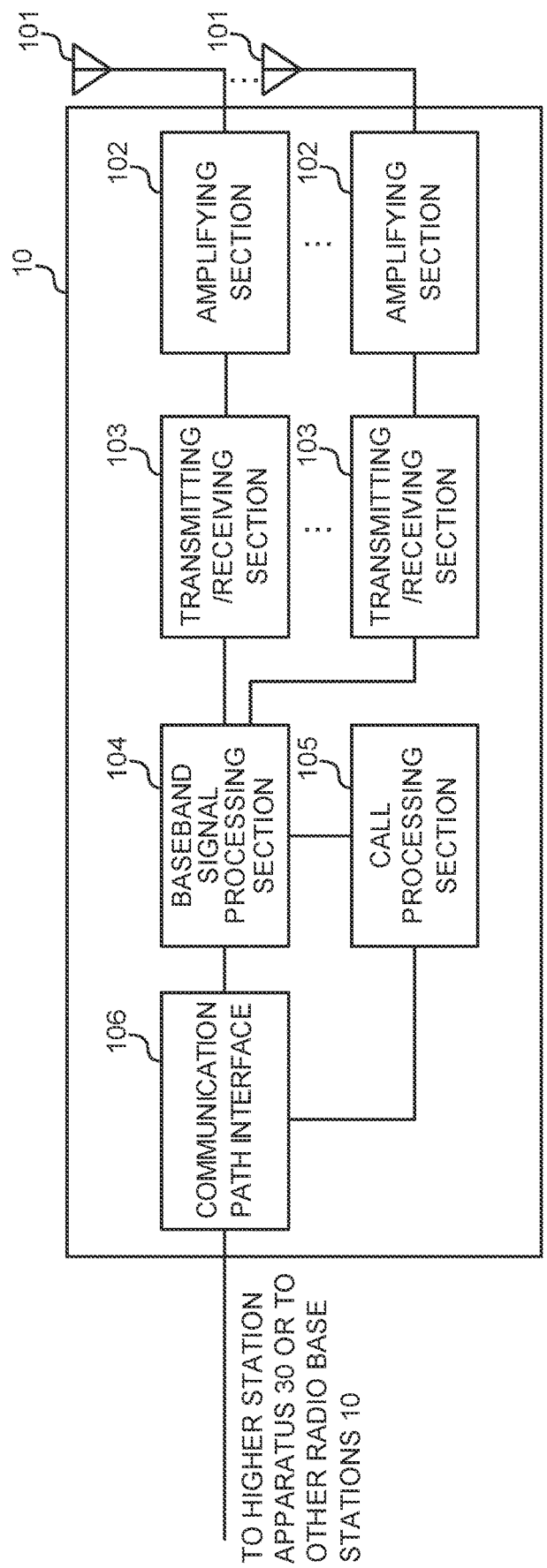
FIG. 4 is a diagram to show an example of an overall structure of a radio base station according to one embodiment of the present invention.

FIG. 4 is a diagram to show an example of an overall structure of the radio base station according to one embodiment of the present invention. A radio base station 10 includes a plurality of transmitting/receiving antennas 101, amplifying sections 102, transmitting/receiving sections 103, a baseband signal processing section 104, a call processing section 105 and a transmission line interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the transmission line interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a pre-coding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can include transmitters/receivers, transmitting/receiving circuits or transmitting/receiving apparatus that can be described based on general understanding of the technical field to which the present invention pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the transmission line interface 106. The call processing section 105 performs call processing (setting up, releasing and so on) for communication channels, manages the state of the radio base station 10, manages the radio resources and so on.

The transmission line interface 106 transmits and/or receives signals to and/or from the higher station apparatus 30 via a certain interface. The transmission line interface 106 may transmit and/or receive signals (backhaul signaling) with other radio base stations 10 via an inter-base station interface (for example, an optical fiber in compliance with the CPRI (Common Public Radio Interface) and an X2 interface).

The transmitting/receiving sections 103 transmit the downlink control information allocated to a plurality of search space sets configured for one or more cells, by use of the PDCCH. The transmitting/receiving sections 103 may transmit information on the search space configured for each cell (or CC) (search space set or the like). The transmitting/receiving sections 103 may control downlink control channel transmission based on the number of downlink control channel candidates defined for each subcarrier spacing with respect to a certain downlink control channel.

Figure 5:
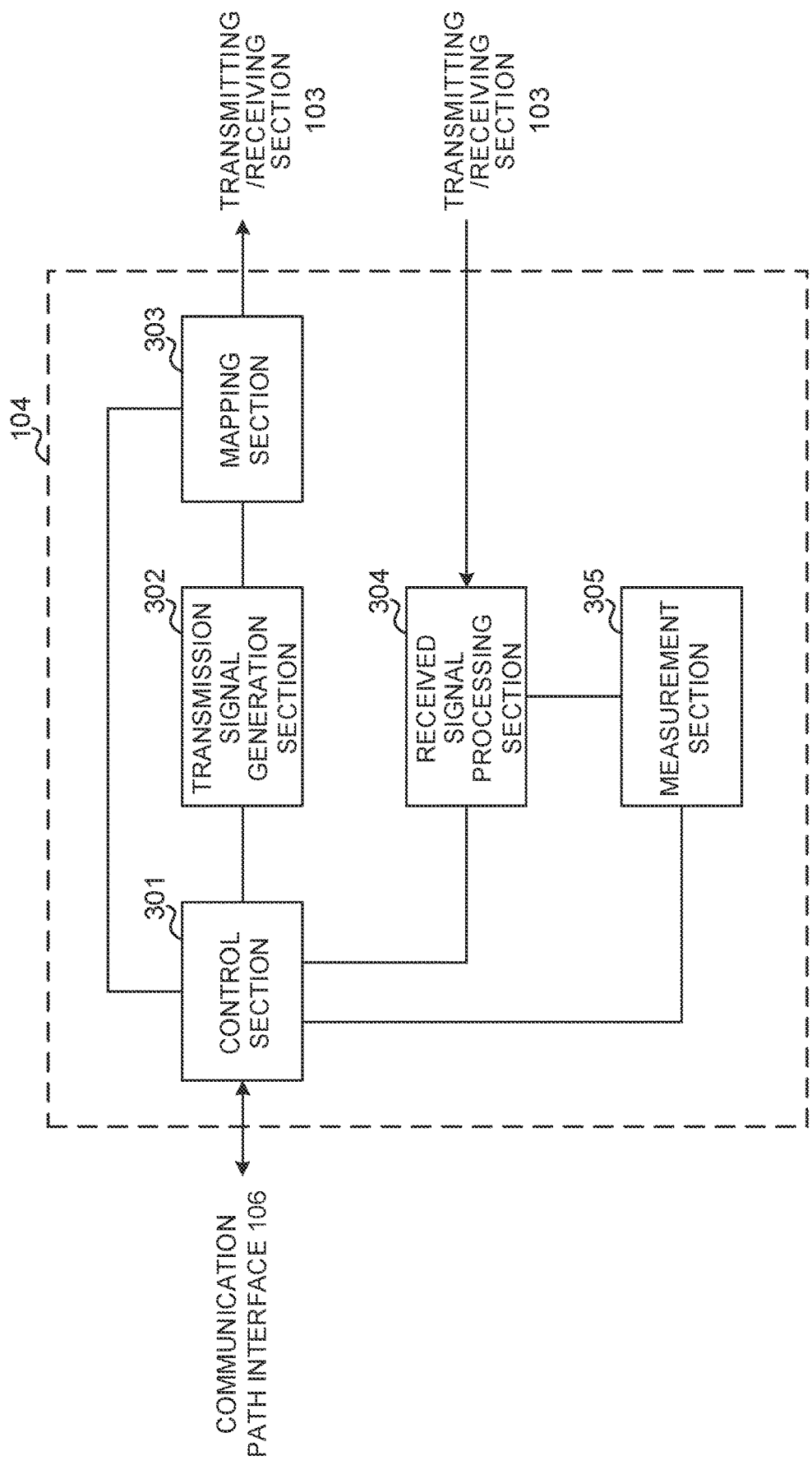
FIG. 5 is a diagram to show an example of a functional structure of the radio base station according to one embodiment of the present invention.

FIG. 5 is a diagram to show an example of a functional structure of the radio base station according to one embodiment of the present invention. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present invention pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls scheduling (for example, resource allocation) of system information, a downlink data signal (for example, a signal transmitted on a PDSCH), and a downlink control signal (for example, a signal transmitted on a PDCCH and/or an EPDCCH, acknowledgment information, and so on). Based on the results of determining necessity or not of retransmission control to the uplink data signal, or the like, the control section 301 controls generation of a downlink control signal, a downlink data signal, and so on. The control section 301 controls the scheduling of a synchronization signal (for example, a PSS (Primary Synchronization Signal)/an SSS (Secondary Synchronization Signal)), a downlink reference signal (for example, a CRS, a CSI-RS, a DMRS), and so on.

The control section 301 controls scheduling of an uplink data signal (for example, a signal transmitted on a PUSCH), an uplink control signal (for example, a signal transmitted on a PUCCH and/or a PUSCH, acknowledgment information, and so on), a random access preamble (for example, a signal transmitted on a PRACH), an uplink reference signal, and so on.

The control section 301 may control the downlink control channel transmission in at least one of a plurality of cells having a plurality of numerologies. The control section 301 may control reception of a parameter indicating a capability for monitoring of the downlink control channel candidates. The control section 301 may determine at least one number of a first maximum number of blind decodings of the downlink control channel candidates within a unit of time and a second maximum number of channel estimation control channel elements within the unit of time for each of the plurality of numerologies based on the parameter to control the mapping of the downlink control channel candidates based on the number.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can include a signal generator, a signal generation circuit or signal generation apparatus that can be described based on general understanding of the technical field to which the present invention pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing and modulation processing are performed in accordance with a coding rate, modulation scheme, or the like determined based on channel state information (CSI) from each user terminal 20.

The mapping section 303 maps the downlink signals generated in the transmission signal generation section 302 to certain radio resources, based on commands from the control section 301, and outputs these to the transmitting/receiving sections 103. The mapping section 303 can include a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can include a signal processor, a signal processing circuit or signal processing apparatus that can be described based on general understanding of the technical field to which the present invention pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can include a measurer, a measurement circuit or measurement apparatus that can be described based on general understanding of the technical field to which the present invention pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI), and so on. The measurement results may be output to the control section 301.

(User Terminal)

Figure 6:
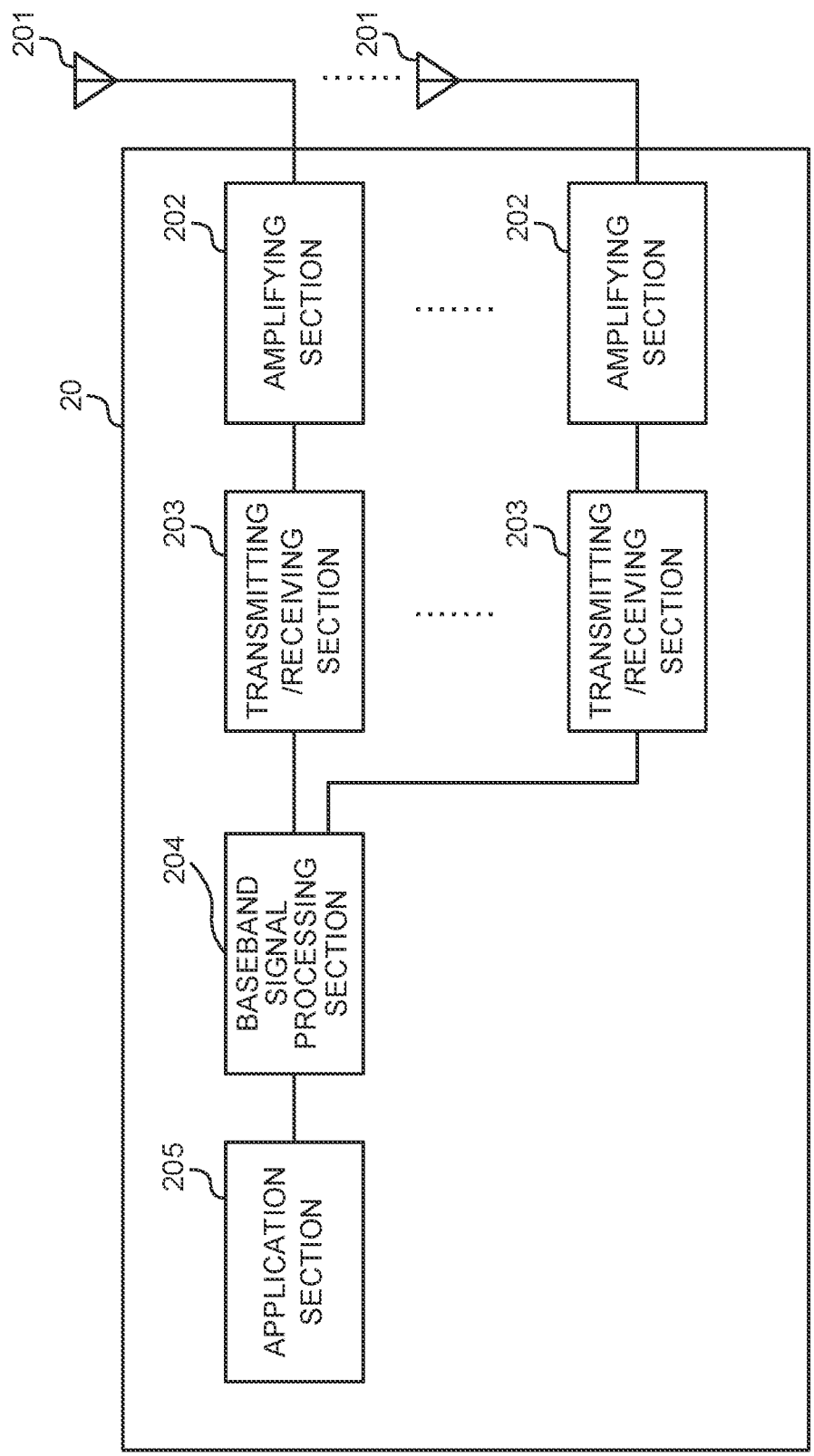
FIG. 6 is a diagram to show an example of an overall structure of a user terminal according to one embodiment of the present invention.

FIG. 6 is a diagram to show an example of an overall structure of a user terminal according to one embodiment of the present invention. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present invention pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

The transmitting/receiving sections 203 monitor a plurality of search space sets configured for one or more cells to receive the downlink control channel (or the downlink control information). The transmitting/receiving sections 203 may receive information on the search space configured for each cell (or CC) (search space set or the like). The transmitting/receiving sections 203 may control downlink control channel reception based on the number of downlink control channel candidates defined for each subcarrier spacing with respect to a certain downlink control channel.

Figure 7:
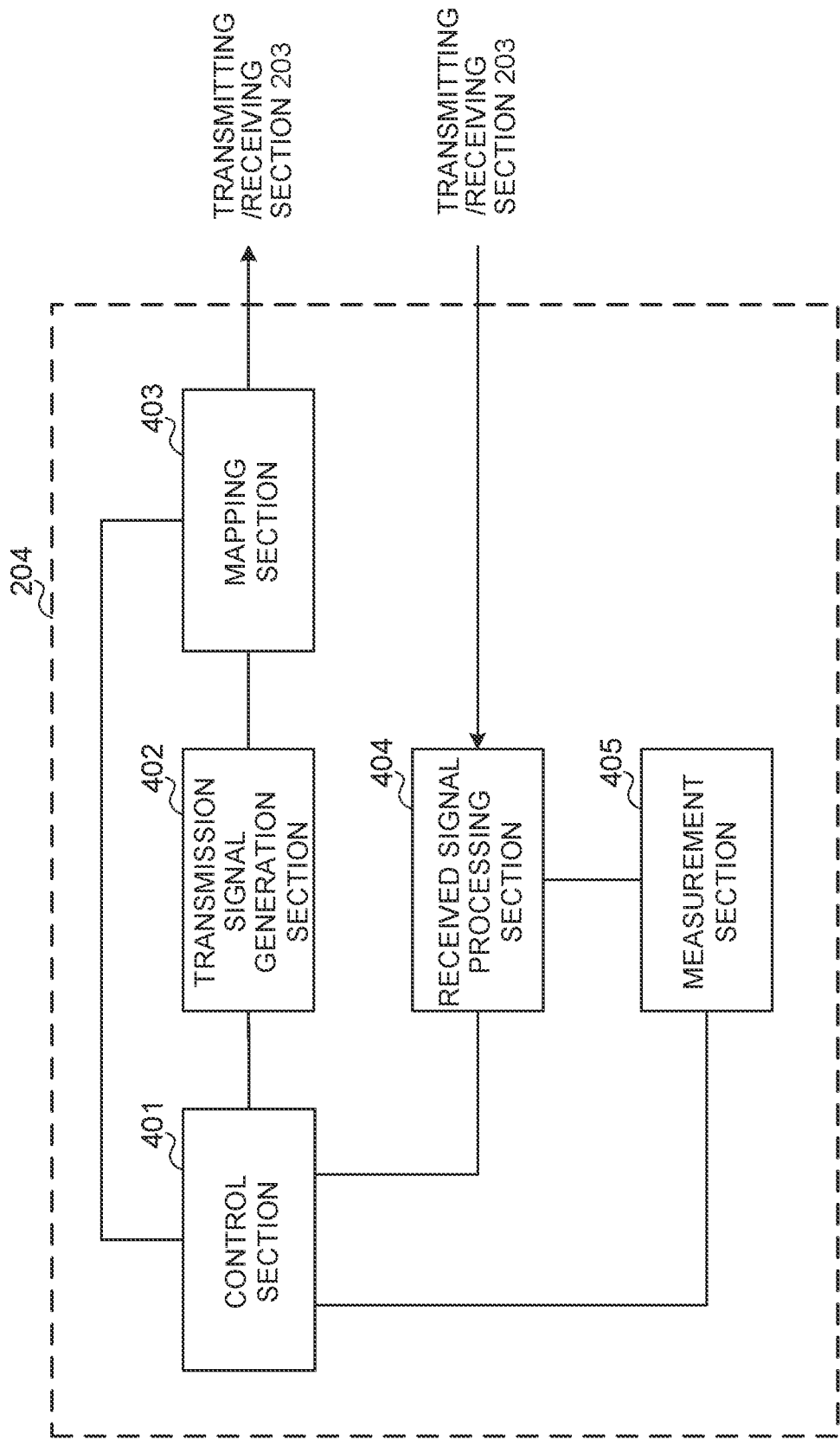
FIG. 7 is a diagram to show an example of a functional structure of the user terminal according to one embodiment of the present invention.

FIG. 7 is a diagram to show an example of a functional structure of a user terminal according to one embodiment of the present invention. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can include a controller, a control circuit or control apparatus that can be described based on general understanding of the technical field to which the present invention pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

The control section 401 may control monitoring of the downlink control channel candidates in at least one of a plurality of cells having a plurality of numerologies. The control section 401 may control transmission of a parameter indicating a capability for the monitoring.

The control section 401 may determine at least one number of a first maximum number of blind decodings of the downlink control channel candidates within a unit of time (BD maximum number, for example, X×M, or y×M) and a second maximum number of channel estimation control channel elements within the unit of time (CCE maximum number, for example, X×N, or y×N) for each of the plurality of numerologies based on the parameter (for example, y) to control the monitoring based on the number.

In a case that two or more cells of the plurality of cells have one of the plurality of numerologies, the number may be at least one of the first maximum number of blind decodings of the downlink control channel candidates within the unit of time in the two or more cells and the second maximum number of channel estimation control channel elements within the unit of time in the two or more cells.

The control section 401 may determine the number based on a coefficient associated with one of the plurality of numerologies (for example, M or N) and the parameter.

The control section 401 may determine the first maximum number and the second maximum number for each of the plurality of numerologies based on the parameter.

At least one search space set may be configured for the two or more cells, and the downlink control channel candidates may be mapped to the search space set based on the number.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can include a signal generator, a signal generation circuit or signal generation apparatus that can be described based on general understanding of the technical field to which the present invention pertains.

For example, the transmission signal generation section 402 generates an uplink control signal about transmission confirmation information, the channel state information (CSI), and so on, based on commands from the control section 401. The transmission signal generation section 402 generates uplink data signals, based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can include a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can include a signal processor, a signal processing circuit or signal processing apparatus that can be described based on general understanding of the technical field to which the present invention pertains. The received signal processing section 404 can constitute the receiving section according to the present invention.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can include a measurer, a measurement circuit or measurement apparatus that can be described based on general understanding of the technical field to which the present invention pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus.

Figure 8:
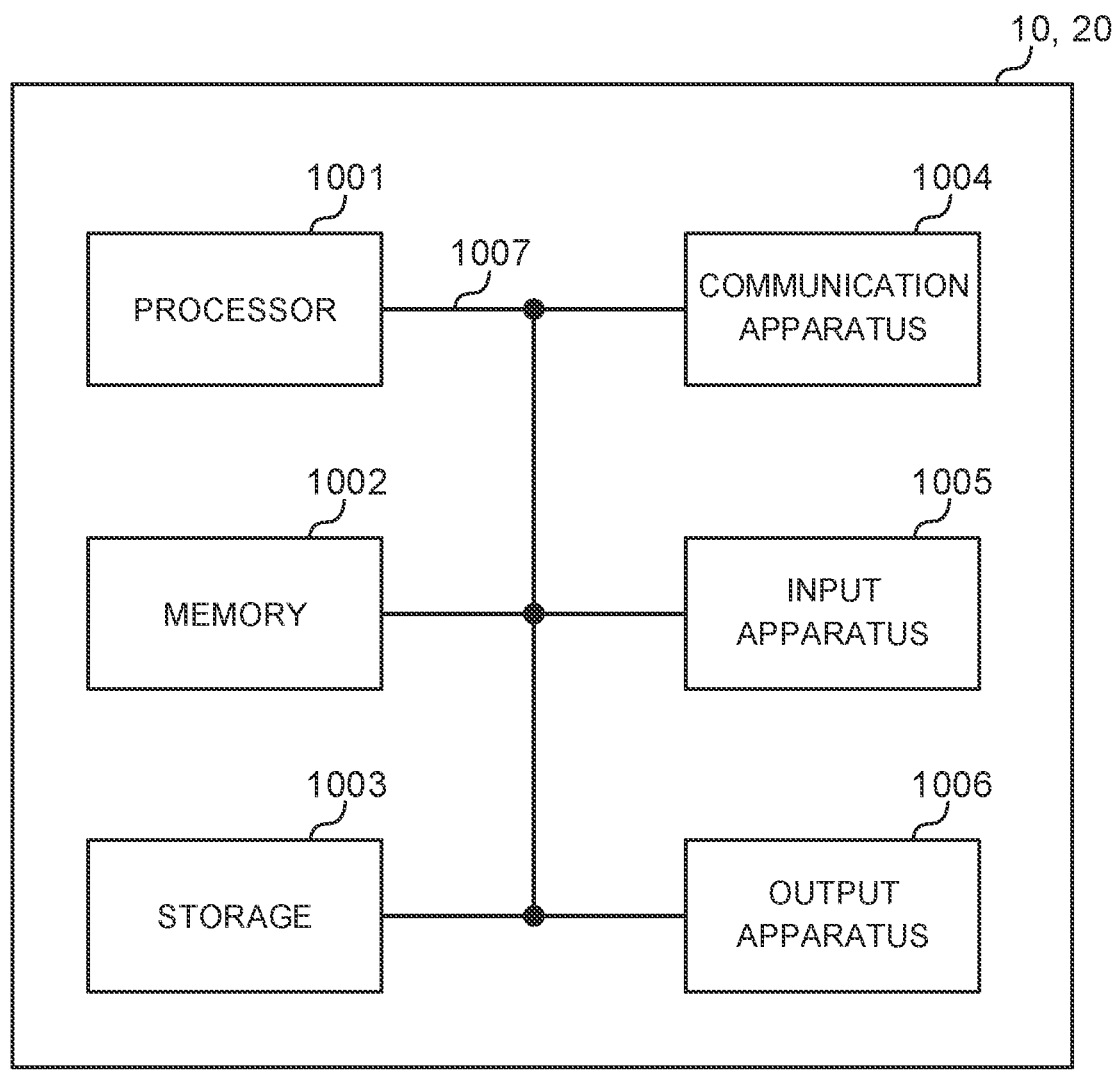
FIG. 8 is a diagram to show an example of a hardware structure of the radio base station and the user terminal according to one embodiment of the present invention.

For example, a radio base station, a user terminal, and so on according to one embodiment of the present disclosure may function as a computer that executes the processes of the radio communication method of the present disclosure. FIG. 8 is a diagram to show an example of a hardware structure of the radio base station and the user terminal according to one embodiment. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the radio base station 10 and the user terminal 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving antennas 101 (201), amplifying sections 102 (202), transmitting/receiving sections 103 (203), transmission line interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, at least one of "channels" and "symbols" may be replaced by "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, the numerology may be communication parameters applied to at least one of transmission and reception of a certain signal or channel. For example, the numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms.

For example, one subframe may be referred to as a "transmission time interval (TTI)," a plurality of consecutive subframes may be referred to as a "TTI" or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, codewords, and so on, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain.

Also, an RB may include one or a plurality of symbols in the time domain, and may be one slot, one mini-slot, one subframe, or one TTI in length. One TTI and one subframe each may be constituted of one or a plurality of resource blocks.

Note that one or a plurality of RBs may be referred to as a "physical resource block (PRB (Physical RB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH (Physical Uplink Control Channel), PDCCH (Physical Downlink Control Channel), and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure are used interchangeably.

In the present disclosure, the terms such as a "base station (BS)," a "radio base station," a "fixed station," a "NodeB," an "eNodeB (eNB)," a "gNodeB (gNB)," an "access point," a "transmission point," a "reception point," a "transmission/reception point," a "cell," a "sector," a "cell group," a "carrier," a "component carrier," a "bandwidth part (BWP)," can be used interchangeably. The base station may be referred to as the terms such as a "macro cell," a "small cell," a "femto cell," a "pico cell."

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," "terminal," and so on may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be also referred to as a transmission apparatus, a reception apparatus, and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation.

Furthermore, the radio base station in the present disclosure may be interpreted as a user terminal. For example, each aspect/embodiment of the present disclosure may be applied to a configuration in which communication between a radio base station and a user terminal is replaced with communication among a plurality of user terminals (for example, which may be referred to as D2D (device-to-device) or V2X (vehicle-to-everything)). In this case, the user terminals 20 may have the functions of the radio base stations 10 described above. The words "uplink," "downlink," and so on may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as the radio base station. In this case, the radio base stations 10 may have the functions of the user terminals 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods, next-generation systems that are enhanced based on these, and so on. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables, printed electrical connections, and so on, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." The terms "separate," "be coupled" and so on may be interpreted similarly.

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
   a transmitting section that transmits a parameter indicating a capability related to physical downlink control channel (PDCCH) blind decoding for carder aggregation; and
   a control section that, when a plurality of downlink cells are configured, the plurality of downlink cells have a plurality of subcarrier spacing configurations respectively, and the plurality of subcarrier spacing configurations includes different values, determines a first maximum number of monitored PDCCH candidates per slot and a second maximum number of monitored control channel elements (CCEs) per slot for each value of the different values based on the number of the plurality of the downlink cells and the parameter.

2. The terminal according to claim 1, wherein a first constant and a second constant are defined for the value, and
   the control section determines the first maximum number based on a product of the parameter and the first constant and determines the second maximum number based on a product of the parameter and the second constant.

3. The terminal according to claim 2, wherein the first constant is the maximum number of monitored PDCCH candidates per slot in case that the carrier aggregation is not used, and
   the second constant is the maximum number of monitored CCEs per slot in case that the carrier aggregation is not used.

4. The terminal according to claim 1, wherein the parameter is one of integers from 4 to 16.

5. The terminal according to claim 2, wherein the parameter is one of integers from 4 to 16.

6. The terminal according to claim 3, wherein the parameter is one of integers from 4 to 16.

7. A radio communication method for a terminal comprising:
   transmitting a parameter indicating a capability related to physical downlink control channel (PDCCH) blind decoding for carrier aggregation; and
   when a plurality of downlink cells are configured, the plurality of downlink cells have a plurality of subcarrier spacing configurations respectively, and the plurality of subcarrier spacing configurations includes different values, determining a first maximum number of monitored PDCCH candidates per slot and a second maximum number of monitored control channel elements (CCEs) per slot for each value of the different values based on the number of the plurality of the downlink cells and the parameter.

8. A base station comprising:
   a receiving section that receives a parameter indicating a capability related to physical downlink control channel (PDCCH) blind decoding for carrier aggregation; and
   a control section that, when a plurality of downlink cells are configured, the plurality of downlink cells have a plurality of subcarrier spacing configurations respectively, and the plurality of subcarrier spacing configurations includes different values, assumes that a first maximum number of monitored PDCCH candidates per slot and a second maximum number of monitored control channel elements (CCEs) per slot are determined for each value of the different values based on the number of the plurality of the downlink cells and the parameter.

* * * * *

UNITED STATES PATENT AND TRADEMARK OFFICE
CERTIFICATE OF CORRECTION

PATENT NO. : 11,323,997 B2
APPLICATION NO. : 17/054379
DATED : May 3, 2022
INVENTOR(S) : Kazuki Takeda et al.

It is certified that error appears in the above-identified patent and that said Letters Patent is hereby corrected as shown below:

In the Claims

At Column 25, Claim number 1, Line number 54, please replace "carder" with "carrier"

Signed and Sealed this
Twenty-second Day of November, 2022

Katherine Kelly Vidal
*Director of the United States Patent and Trademark Office*